United States Patent
Koh et al.

(10) Patent No.: US 9,329,840 B1
(45) Date of Patent: May 3, 2016

(54) GRAPHICAL PROGRAMMING OF CUSTOM DEVICE DRIVERS

(71) Applicant: The MathWorks, Inc., Natick, MA (US)

(72) Inventors: David Koh, Boston, MA (US); Zijad Galijasevic, Shrewsbury, MA (US)

(73) Assignee: The MathWorks, Inc., Natick, MA (US)

( * ) Notice: Subject to any disclaimer, the term of this patent is extended or adjusted under 35 U.S.C. 154(b) by 38 days.

(21) Appl. No.: 14/264,436

(22) Filed: Apr. 29, 2014

Related U.S. Application Data

(63) Continuation of application No. 11/324,086, filed on Dec. 30, 2005, now abandoned.

(51) Int. Cl.
 *G06F 9/44* (2006.01)

(52) U.S. Cl.
 CPC ...... *G06F 8/34* (2013.01); *G06F 8/35* (2013.01)

(58) Field of Classification Search
 IPC .............. G06F 8/31,11/2733, 17/5054, 17/5045, G06F 3/048; G05B 2219/23258, 2219/23291, G05B 17/00, 19/05
 See application file for complete search history.

(56) References Cited

U.S. PATENT DOCUMENTS

| | | | |
|---|---|---|---|
| 4,821,172 A | | 4/1989 | Kaneko et al. |
| 5,301,336 A | * | 4/1994 | Kodosky et al. ............. 715/846 |
| 5,313,615 A | | 5/1994 | Newman et al. |
| 5,339,432 A | | 8/1994 | Crick |
| 5,440,740 A | * | 8/1995 | Chen et al. ................... 718/104 |
| 5,613,123 A | | 3/1997 | Tsang et al. |
| 5,781,797 A | | 7/1998 | Crick et al. |
| 6,161,154 A | * | 12/2000 | Schultz et al. ................ 710/56 |
| 6,219,628 B1 | | 4/2001 | Kodosky et al. |
| 6,965,769 B2 | * | 11/2005 | Bims et al. .................... 455/423 |
| 6,965,800 B2 | | 11/2005 | Schmit et al. |
| 6,996,799 B1 | | 2/2006 | Cismas et al. |
| 7,290,244 B2 | | 10/2007 | Peck et al. |
| 7,565,631 B1 | | 7/2009 | Banerjee et al. |

(Continued)

OTHER PUBLICATIONS

MathWorks, "Simulink: Model based and System based Design", Using Simulink, version V5, copyright 1990-2002, 236 pgs <SimulinkV5.pdf>.*

(Continued)

*Primary Examiner* — Tuan Vu
(74) *Attorney, Agent, or Firm* — Harrity & Harrity, LLP

(57) ABSTRACT

The present invention provides a set of blocks for creating device drivers. Since, for most computational devices, device driver code to configure and control an I/O interface may be decomposed into a small finite number of common software functions, by providing a block set comprising blocks representing the finite number of common software functions, custom device drivers can be created for any number of devices. Thus, by providing a set of generalized device driver blocks that can be parameterized by the user, specific instances of custom device drivers can be created as needed. Processor and device specific driver code can then be generated from the custom device driver.

20 Claims, 14 Drawing Sheets

(56) References Cited

U.S. PATENT DOCUMENTS

| | | | |
|---|---|---|---|
| 2002/0080174 A1* | 6/2002 | Kodosky et al. | 345/762 |
| 2003/0005179 A1* | 1/2003 | Schmit et al. | 709/328 |
| 2003/0018953 A1 | 1/2003 | Aberg | |
| 2003/0074489 A1* | 4/2003 | Steger et al. | 710/1 |
| 2003/0192032 A1 | 10/2003 | Andrade et al. | |
| 2004/0005859 A1* | 1/2004 | Ghercioiu et al. | 455/3.01 |
| 2004/0078180 A1 | 4/2004 | Allen et al. | |
| 2005/0289274 A1 | 12/2005 | Ghercioiu et al. | |
| 2006/0015862 A1 | 1/2006 | Odom et al. | |
| 2006/0026307 A1* | 2/2006 | Bragagnini et al. | 710/22 |
| 2006/0041860 A1* | 2/2006 | Carmichael et al. | 717/109 |
| 2007/0088865 A1* | 4/2007 | Breyer | 710/22 |

OTHER PUBLICATIONS

Mathworks, "Stateflow and StateFlow coder", User's Guide, Version 5, copyright 1997-2002—chp. 1-14 <MW_SFCV5.pdf>.*

Co-pending U.S. Appl. No. 11/324,086 by David Koh et al., entitled "Graphical Programming of Custom Device Drivers", filed Dec. 30, 2005, 43 pages.

Mathworks, "Stateflow and StateFlow coder", User's Guide, Version 5, copyright 1997-2002—chp. 1-15, pp. 1-316, <stateFlowV5.pdf>.

* cited by examiner

GRAPHICAL PROGRAMMING OF CUSTOM DEVICE DRIVERS

RELATED APPLICATION

This application is a continuation of U.S. patent application Ser. No. 11/324,086, filed Dec. 30, 2005, the disclosure of which is incorporated herein by reference.

FIELD OF THE INVENTION

The present invention relates to a modeling environment for modeling electronic devices. More particularly, the present invention relates to graphical programming of custom device drivers for electronic devices.

BACKGROUND OF THE INVENTION

Many organizations are embracing the paradigm of Model Based Development in their production processes. "Model Based Development" refers to the practice of specifying, analyzing, and implementing systems using a common "model" consisting of a set of block diagrams and associated objects. System implementation typically entails automatically generating code for portions of the model, in particular portions of the system intended to run on embedded hardware.

Graphical modeling environments are an example of software applications that may enable a user to model dynamic systems i.e., systems whose outputs change over time, using a graphical model, such as a block diagram. Some graphical modeling environments also enable simulation and analysis of models. Simulating a dynamic system in a graphical modeling environment is typically a two-step process. First, a user creates a graphical model, such as a block diagram, of the system to be simulated. A graphical model may be created using a graphical user interface, such as a graphical model editor. The graphical model depicts time-based relationships between the systems inputs, states, parameters and outputs. After creation of the graphical model, the behavior of the dynamic system over a specified time period is simulated using the information entered into the graphical model. In this step, the graphical model is used to compute and trace the temporal evolution of the dynamic system outputs ("execute the graphical model") and automatically produce either deployable software systems or descriptions of hardware systems that mimic the behavior of either the entire model or portions of the model ("code generation").

Block diagrams are graphical entities having an "executable meaning" that are created within graphical modeling environments for modeling a dynamic system, and generally comprise one or more graphical objects. For example, a block diagram model of a dynamic system is represented schematically as a first collection of graphical objects, such as nodes, which are interconnected by another set of graphical objects, generally illustrated as lines, which represent logical connections between the first collection of graphical objects. In most block diagramming paradigms, the nodes are referred to as "blocks" and drawn using some form of geometric object (e.g., a circle, a rectangle, etc.). The line segments are often referred to as "signals". Signals correspond to the time-varying quantities represented by each line connection and are assumed to have values at each time instant. Each node may represent an elemental dynamic system, and the relationships between signals and state variables are defined by sets of equations represented by the nodes. Inherent in the definition of the relationship between the signals and the state variables is the notion of parameters, which are the coefficients of the equations. These equations define a relationship between the input signals, output signals, state, and time, so that each line represents the input and/or output of an associated elemental dynamic system. A line emanating at one node and terminating at another signifies that the output of the first node is an input to the second node. Each distinct input or output on a node is referred to as a "port." The source node of a signal writes to the signal at a given time instant when its system equations are solved. The destination node of this signal read from the signal when their system equations are being solved. In some instances, the nodes of a system represent actual computing platforms, such as processors, field programmable gate arrays, application specific integrated circuits, programmable logic devices, and hardware devices, such as memory, buffers, adaptors, and physical interface ports. The lines between such nodes represent the interfaces between the devices. Those skilled in the art will recognize that the term "nodes" does not refer exclusively to elemental dynamic systems but may also include other modeling elements that aid in readability and modularity of block diagrams.

Traditionally, when designing a system from which code will be generated, in order to generate the proper code, a target computing platform must be selected. This selection informs the graphical modeling environment which processor, FPGA, ASIC or the like, the system is to operate on or with. Typically, target computing platforms operate on data acquired through hardware input devices and emit the resultant processed through hardware devices, therefore the interfaces to the I/O devices are integral parts of the system design. Consequently, device driver code for all the devices of the modeled system is generated to operate on the "targeted" computing platform. An example of this can be seen in the block diagram model 100 of FIG. 1. In this example the block diagram contains an Analog-to-Digital Converter (ADC) 110, a processing block 120, and Digital-to-Analog Converter (DAC) 130. The ADC 110 provides digitized data that is passed to the processing block 120. The digitized data is processed by the processing block 120 once the ADC 110 triggers the processing via an interrupt (denoted by dotted line), and then the resultant processed data is sent to the DAC block. The target computing platform for this system, as indicted by the icon 140 in the bottom left corner, is a C6416 DSP processor which is part of the Texas Instruments C6000 DSP family. The ADC 110 and DAC 130 are also specific to the Texas Instruments device TLV320AIC23, as indicated by the block names. As such, the ADC 110 and DAC 130 blocks are therefore "hard-coded" for the TLV320AIC23, and cannot work for any other device. Likewise, other devices, such as an analog-to-digital converter or digital-to-analog converter from another manufacturer, require device and computer platform specific blocks in order for the proper device drivers to be generated for a C6416 DSP.

One problem with this approach is that in order to create the driver code for a specific device to be controlled by a "targeted" computing platform, the specific device must be part of a provided library of recognized devices for the proper driver code to be generated for the targeted platform. That is, in order for driver code to be generated for a device, such as an analog-to-digital converter, to be controlled by a targeted platform, the analog-to-digital converter must be in the library of "known" devices for the targeted platform so that the graphical modeling environment can generate the required driver code. This means if a device to be controlled is not in the library of supported devices for a specific target platform then driver code cannot be automatically generated for the device. Thus a user is limited to using only the devices that are supported for a given target, or else the user must obtain new device driver blocks, either relying on a vendor to provide the driver blocks or creating them from scratch.

What is needed is a method for creating any number of device drivers for a target platform that is not restricted to the original library of supported devices for each target computing platform.

SUMMARY OF THE INVENTION

The present invention provides a set of blocks for creating device drivers. Since, for most computational platforms, device driver code to configure and control an I/O interface may be decomposed into a small finite number of common software functions, by providing a block set comprising blocks representing the finite number of common software functions, custom device drivers can be created for any number of devices.

Using one or more of the blocks from the block set, device drivers can be created. By using the driver constructing block set, drivers can be created, as a collection or subsystem of one or more interconnected blocks from the driver constructing block set, for specific devices without requiring a specific driver for each device being controlled by a targeted platform.

In accordance with a first aspect, in a graphical modeling environment, a method is provided. The method comprises providing a custom driver block set, wherein one or more blocks of the block set can be used to create a driver for an electronic device; and assembling a driver for an electronic device using one or more of the blocks of the custom driver block set.

In accordance with another aspect, a medium is provided for use with a computing device holding instructions executable by the computing device for performing a method. The method comprises providing a custom driver block set, wherein one or more blocks of the block set can be used to create a driver for an electronic device; and assembling a driver for an electronic device using one or more of the blocks of the custom driver block set.

In accordance with another aspect, a system is provided for generating and displaying a graphical modeling application. The system comprises user-operable input means for inputting data to the graphical modeling application; a display device for displaying a graphical model; and a computing device including memory for storing computer program instructions and data, and a processor for executing the stored computer program instructions, the computer program instructions including instructions for providing a custom driver block set, wherein one or more blocks of the block set can be used to create a driver for an electronic device; and assembling a driver for an electronic device using one or more of the blocks of the custom driver block set.

In accordance with another aspect, a system is provided for generating and displaying a graphical modeling application. The system comprises a distribution server for providing to a client device, a custom driver block set, wherein one or more blocks of the block set can be used to create a driver for an electronic device; and a client device in communication with the distribution server.

In accordance with another aspect, in a network having a server, executing a graphical modeling environment, and a client device in communication with the server, a method is provided. The method comprises the steps of providing, at the server, a custom driver block set, wherein one or more blocks of the block set can be used to create a driver for an electronic device; receiving, at the server from the client device, a selection of one or more blocks of the custom driver block set; and assembling a driver for an electronic device using one or more of the blocks of the custom driver block set.

DETAILED DESCRIPTION OF AN ILLUSTRATIVE EMBODIMENT

An illustrative embodiment of the present invention relates to graphically creating custom device drivers. The present invention will be described relative to illustrative embodiments. Those skilled in the art will appreciate that the present invention may be implemented in a number of different applications and embodiments and is not specifically limited in its application to the particular embodiments depicted herein.

For the purpose of discussion in this application, the following terms are given the following meaning in this application.

A processor includes, but not limited to, general purpose processor (GPP), microcontroller, and Digital Signal Processor (DSP).

A computational IC includes, but not limited to, FPGA, ASIC, programmable logic device (PLD), and programmable logic array (PLA).

A computing platform is a processor or a computational IC.

A hardware description language (HDL) includes, but not limited to, VHDL, Verilog, SystemC, SystemVerilog, and the like programming languages to describe computational IC.

A device driver is software that a computing platform uses to communicate with an electronic I/O device such as an analog-to-digital converter, hardware FIFO, Video Decoder, or to communicate with standard or custom electronic interfaces, such as RS-232, CAN, TCP/IP, USB, JTAG, and the like. The devices can reside within the computing platform or external to it. The interfaces can be serial or parallel.

A model is an application design that is created and executed within a simulation environment, such as MATLAB and Simulink, on a host computer. From a model, code can be automatically generated that represents the application design for execution on a computing platform.

A subsystem is a hierarchical model abstraction that can include multiple blocks and other subsystems.

Since, for most computing platforms, device driver code to configure and control an I/O interface may be decomposed into a small finite number of common software functions, by providing a block set comprising blocks representing the finite number of common software functions, custom device drivers can be created for any number of devices. Thus, by providing a set of generalized device driver blocks that can be parameterized by the user, specific instances of custom device drivers can be created as needed. Processor and device specific driver code can then be generated from the custom device driver.

Figure 2:
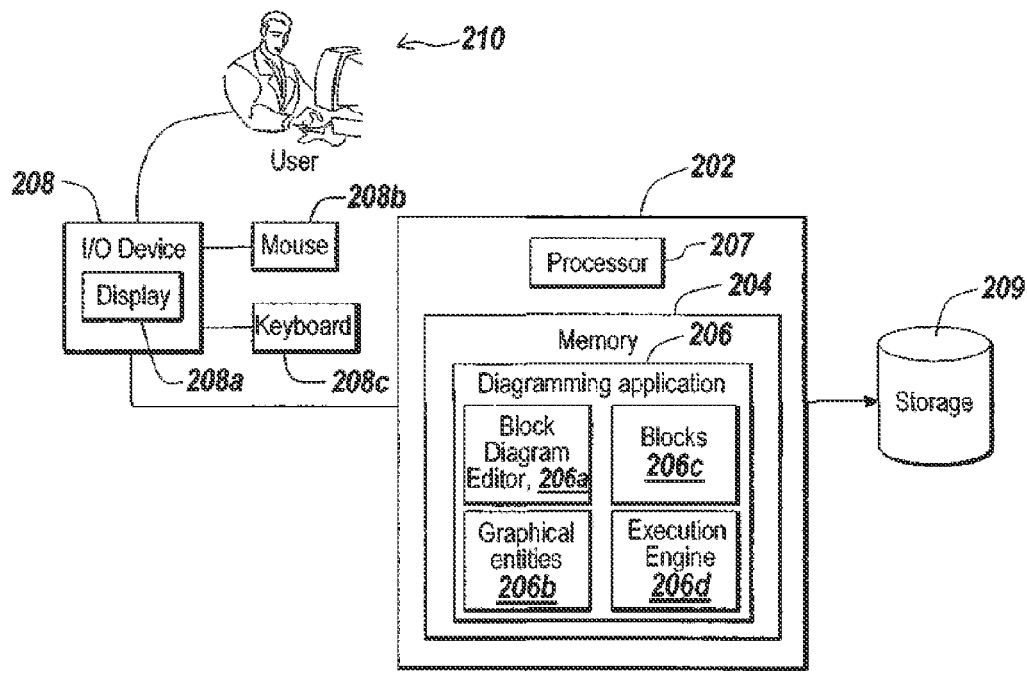
FIG. 2 illustrates an environment suitable for practicing an illustrative embodiment of the present invention.

FIG. 2 depicts an environment suitable for practicing an illustrative embodiment of the present invention. A computing device 202 includes memory 204, on which software according to one embodiment of the present invention is stored, one or more processors (CPU) 207 for executing software stored in the memory, and other programs for controlling system hardware. Such processors can have one or more cores allowing for multiple instances of software to run simultaneously on the processor. The use of multiple processors, multiple cores, or both allows for greater computational functionality as multiple applications or processes can be run concurrently on the computing device.

Typically, the interaction of a human user with the computing device 202 occurs through an input/output (I/O) device 208, such as a graphical user interface (GUI). The I/O device 208 may include a display device 208a (such as a monitor) and an input device (such as a mouse 208b and a keyboard 208c and other suitable conventional I/O peripherals.

For example, the memory 204 holds a modeling application 206 capable of creating and simulating digital versions of system models, such as block diagrams, state diagrams, signal diagrams, flow chart diagrams, sequence diagrams, UML diagrams, dataflow diagrams, circuit diagrams, ladder logic diagrams, kinematic element diagrams, or other models, which may be displayed to a user 10 via the display device 208a. In the illustrative embodiment, the modeling application 6 comprises a MATLAB modeling environment, such as Simulink® or another suitable modeling environment. As used herein, the terms "modeling environment" and "graphical modeling environment" refer to an application where a model, such as a model of an electrical system, is created and translated into executable instructions. Examples of suitable modeling applications include, but are not limited to MATLAB, including Simulink, SimMechanics, and SimDriveline from the MathWorks, Inc.; LabVIEW, DasyLab and DiaDem from National Instruments Corporation, VEE from Agilent, SoftWIRE from Measurement Computing, VisSim from Visual Solutions, SystemVIEW from Elanix, WiT from Coreco, Vision Program Manager from PPT Vision, Khoros from Khoral Research, and numerous others. The memory 4 may comprise any suitable installation medium, e.g., a CD-ROM, floppy disks, or tape device; a computer system memory or random access memory such as DRAM, SRAM, EDO RAM, Rambus RAM, etc.; or a non-volatile memory such as a magnetic media, e.g., a hard drive, or optical storage. The memory may comprise other types of memory as well, or combinations thereof.

In an alternate embodiment, the computing device 202 is also interfaced with a network, such as the Internet. Those skilled in the art will recognize that the diagrams used by the diagramming application 206 may be stored either locally on the computing device 202 or at a remote location 209 interfaced with the computing device over a network. Similarly, the diagramming application 206 may be stored on a networked server or a remote peer.

The diagramming application 206 of an illustrative embodiment of the invention includes a number of generic components. Although the discussion contained herein focuses on Simulink, version 6.0 (Release 14) from The MathWorks, Inc. of, Natick Mass., those skilled in the art will recognize that the invention is applicable to other software applications. The generic components of the illustrative diagramming program 206 include a block diagram editor 206a for graphically specifying models of dynamic systems. The block diagram editor 206a allows users to perform such actions as construct, edit, display, annotate, save, and print out a graphical model, such as a block diagram, that visually and pictorially represents a dynamic system. The illustrative diagramming application 206 also includes graphical entities 206b, such as signal lines and buses that represent how data is communicated between functional and non-functional units, and blocks 206c. As noted above, blocks are the fundamental mathematical elements of a classic block diagram model. A block diagram execution engine 206d, also implemented in the application, is used to process a graphical model to produce simulation results, to convert the graphical model to executable code, or perform analyses and related tasks otherwise.

The model editor 206a is the component that allows a user to create and modify a model representing a system. The model editor 6a also allows a user to create and store data relating to model element 206b. A textual interface with a set of commands allows interaction with the model editor. Using this textual interface, users may write special scripts that perform automatic editing operations on the model. A user generally interacts with a set of windows that act as canvases for the model. There is generally more than one window for a model because models may be partitioned into multiple hierarchical levels through the use of subsystems.

The execution engine 206d is the component that processes a graphical model to produce simulation results, to convert the graphical model to executable code, or perform analyses and related tasks otherwise. For a block diagram graphical model, the execution engine 206d translates a block diagram to executable entities following the layout of the block diagram as provided by the user. The executable entities are compiled and executed on a computing device, such as an electronic, optical, or quantum computer, to implement the functionality specified by the model. Typically, the code generation preserves a model hierarchy in a call graph of the generated code. For instance, each subsystem of a model in a block diagram environment can map to a user specified function and the generated code. Real-Time Workshop from the MathWorks, Inc. of Natick, Mass. is an example of a suitable execution engine 206d for generating code.

In certain embodiments the generated code may be used with an external or embedded computing platform. In some embodiments the generated code may be used as the actual application in the deployment of an external computing platform. In some embodiments external computing platforms are used as hardware accelerators to execute the generated code and simulate the modeled system. In some embodiments the generated code may be executed by a virtual environment or Virtual Machine (VM) which simulates or emulates in software a hardware computing platform. Virtual environments may be run on the one or more processors 207. In certain embodiments one or more virtual environments or machines may be run on a single processor or computational IC.

In the illustrative embodiment, the diagramming program 206 is implemented as a companion program to a technical computing program, such as MATLAB, also available from the MathWorks, Inc.

Figure 3:
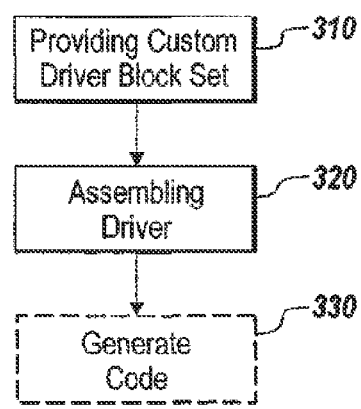
FIG. 3 is an exemplary flowchart of a process implementing intrinsic units of measure in a graphical modeling environment.

According to an illustrative embodiment of the invention, custom device drivers can be created. FIG. 3 depicts an exemplary flow chart 300 of a method of the present invention. The method comprises the steps of providing a custom driver block set 310 and assembling a driver for an electronic device using one or more of the blocks of the custom driver block set 320. In certain embodiments, the method further comprises generating code from the assembled driver 330. These steps will be discussed in greater detail below.

Figure 4:
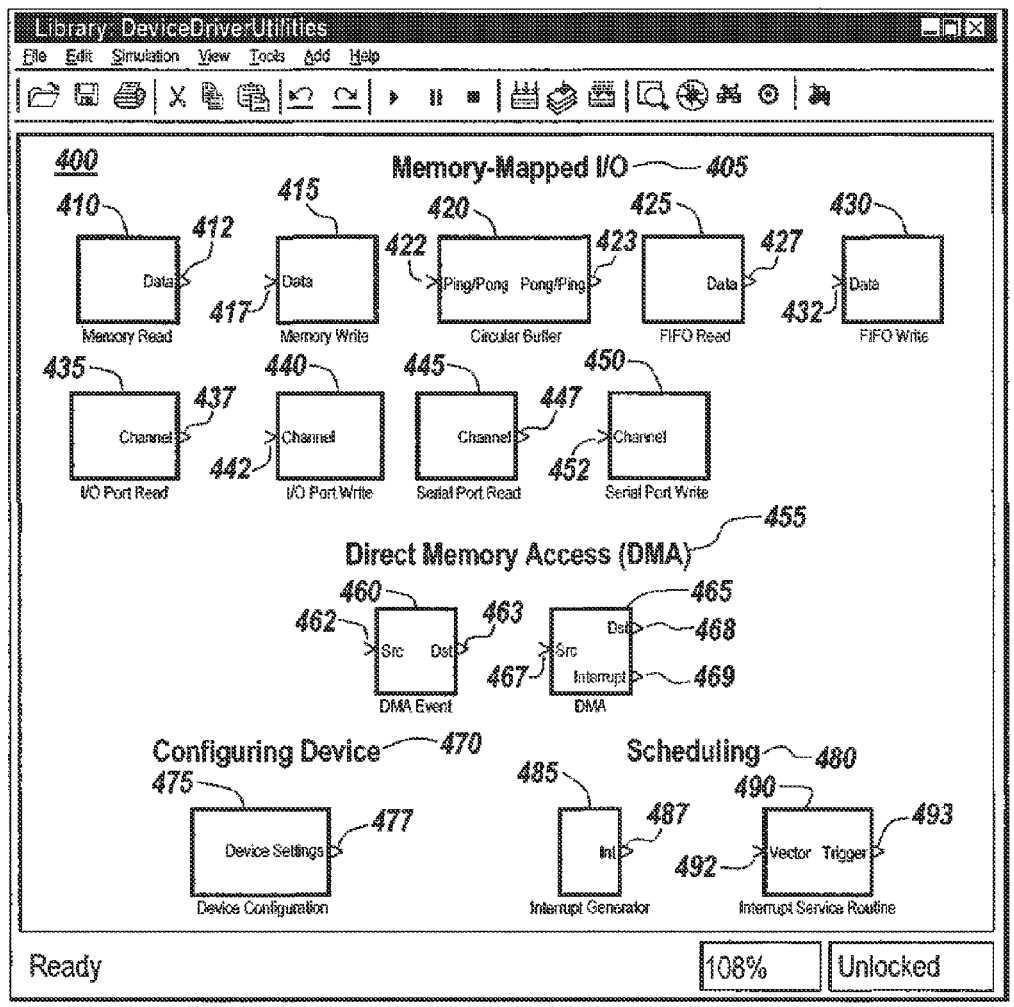
FIG. 4 is an exemplary custom driver block set of the present invention.

FIG. 4 is one embodiment of an exemplary custom driver block set 400. The blocks of this block set represent some of the most common functionality or software functions that are universal to most drivers. In this example the blocks can be grouped in four classes: Memory Mapped I/O blocks 405, Direct Memory Access (DMA) blocks 455, Configuring Device blocks 470, and Scheduling Blocks 480. It should be understood that these classes are by no means exhaustive and additional classes or other possible categorizations will be apparent to one skilled in the art given the benefit of this disclosure.

In this example, the Memory Mapped I/O blocks 405 represent functions to read from and write to physical memory, memory-mapped registers, memory-mapped I/O ports, and memory-mapped devices. The Memory Mapped I/O blocks include Memory Read 410, Memory Write 415, Circular Buffer 420, FIFO Read 425, FIFO Write 430, I/O Port Read 435, I/O Port Write 440, Serial Port Read 445, and Serial Port Write 450. The Memory Read 410 and Write 415 blocks represent the functionality for reading from and writing to memory. In this example, each block has a respective port 412 and 417 for sending or receiving data. The Circular Buffer 420 block represents the functionality for writing to a circular buffer and reading from a circular buffer. In this example, the Circular Buffer 420 block has a port 422 for receiving data and a port 423 for sending data. The FIFO Read 425 and Write 430 blocks represent the functionality for reading from and writing to First-In-First-Out (FIFO) buffers. In this example, each block has a respective port 427 and 432 for sending or receiving data. The I/O Port Read 435 and Write 440 blocks represent the functionality for reading from and writing to input and/or output ports. In this example, each block has a respective port 437 and 442 for sending or receiving data. The Serial Port Read 445 and Write 450 blocks represent the functionality for reading from and writing to serial input and/or output ports. In this example, each block has a respective port 447 and 452 for sending or receiving data. For certain computing platforms, I/O Port Read 435 and Write 440 blocks may be created with Memory Read 410 and Write 415 blocks, and Serial Port Read 445 and Write 450 blocks may be created with I/O Port Read 435 and Write 440 blocks. Similarly, FIFO Read 425 and Write 430 blocks, and Circular Buffer 420 block may be constrained instances of the Memory Read 410 and Write 415 blocks. It should be understood that these blocks are but some of the possible blocks in a Memory-Mapped I/O class. Other possible blocks and configurations of blocks will be apparent to one skilled in the art given the benefit of this disclosure.

In the example of FIG. 4, the DMA blocks 455 represent functions to configure the computing platform's DMA controller. The DMA Event 460 block represents the functionality for setting up Direct Memory Access (DMA) parameters, such as source and destination addresses, address offsets, number of elements to transfer, and the like. In this example, the DMA Event 460 block has a port 462 for receiving data and a port 463 for sending data. The DMA 465 block, which includes the functionality of the DMA Event 460 block (discussed in more detail herein below), switches between multiple DMA events and generates the DMA interrupt to signify end of a DMA event transaction. In this example, the DMA 465 block has a port 467 for receiving data, a port 468 for sending data, and an interrupt port 469 for sending a generated interrupt signal. It should be understood that these blocks are but some of the possible blocks in a DMA class. Other possible blocks, configurations, and implementations will be apparent to one skilled in the art given the benefit of this disclosure.

In the example of FIG. 4, the Configuration Device class 470 comprises a Device Configuration 475 block. The Device Configuration 475 block allows an assembled driver to be configured for a specific device. The Device Configuration 475 block provides the settings that configure the driver for a specific device. In most cases, this block constructs a sequence of control values to configure the device. In most cases the control values are communicated to the device by connecting port 477 to an input port of one of the Memory Mapped I/O blocks, such as the Serial Port Write 450 block. In certain embodiments, the device control values held by the Device Configuration 475 block may be customizable by a user. For example, a user may provide properties or attributes for the devices though graphical user interface, such as a menu. In some embodiments the user may be surveyed about the device to be controlled, for example by filling in fields in an onscreen form. This user interface will be discussed in more detail herein below (see descriptions of FIGS. 7F-7I). Other possible blocks, configurations, and implementations will be apparent to one skilled in the art given the benefit of this disclosure.

In the example of FIG. 4, the Scheduling blocks 480 include a Interrupt Generator 485 block and an Interrupt Service Routine (ISR) 490 block. The Interrupt Generator 485 block represents the functionality for generating an interrupt signal or configuring an externally-generated interrupt. In this example, Interrupt Generator 485 block has a port 487 that sends the interrupt signal, typically to the Interrupt Service Routine 490 block. The Interrupt Service Routine 490 block represents the functionality for an Interrupt Service Routine (ISR). In this example, the Interrupt Service Routine 490 block has a port 492 for receiving an interrupt signal, and a port 493 for sending a trigger signal for subsequent processing. The trigger signal prompts the downstream processing block to commence execution. Other possible blocks, configurations, and implementations will be apparent to one skilled in the art given the benefit of this disclosure.

In certain embodiments, a custom driver blocks set is specific to a targeted platform. For example, the custom driver block set 400 of FIG. 4 could be specific to a C6416 DSP which is part of the Texas Instruments C6000 DSP family as discussed in regard to FIG. 1. That is, for each target computing platform, there may be a particular custom driver block set with blocks representing the functionality supported by the target computing platform. By providing platform specific block sets it ensures that the generated driver code will run on the specific platform. Examples of computing platforms include, but are not limited to, processors, field programmable gate arrays (FPGAs), application specific integrated circuits (ASICs), programmable logic devices as well as simulators, emulators, or any combination thereof.

Thus, using the blocks of a custom driver block set which represent functionality common to most drivers, custom device drivers can be created for any number of devices.

Examples of devices for which drivers can be created include, but are not limited to, analog-to-digital converters, a digital-to-analog converters, hardware FIFOs, hardware buffers, network interfaces, serial interfaces, parallel interfaces, standard or custom electronic interfaces, such as RS-232, CAN, TCP/IP, USB, JTAG, and the like, processors, field programmable gate arrays (FPGAs), application specific integrated circuits (ASICs), programmable logic device, simulators, emulators and the like.

Figure 1:
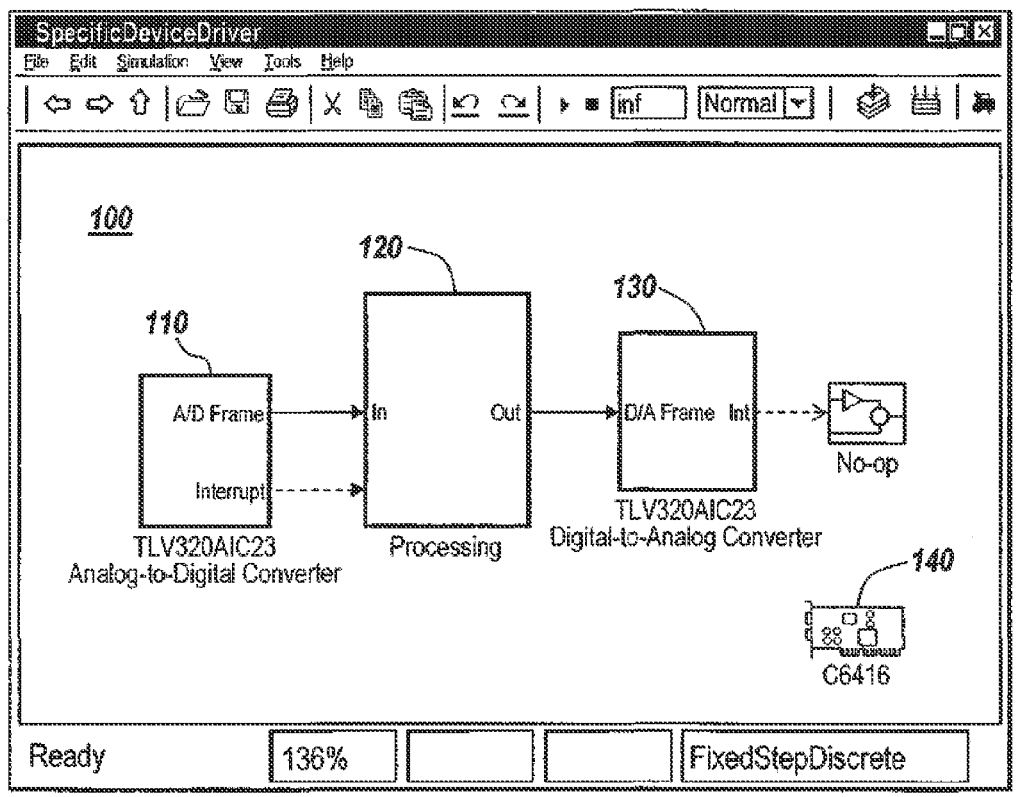
FIG. 1 is an example of a block diagram having an assigned target as previously known.

For example, using the custom driver block set 400 of FIG. 4, drivers for the Analog-to-Digital Converter 110 and Digital-to-Analog Converter 120 of FIG. 1 can be created. For the purpose of this example, the custom driver block set 400 corresponds to the driver functionality supported by the C6416 DSP which is the target platform for the system of FIG. 1.

Figure 5:
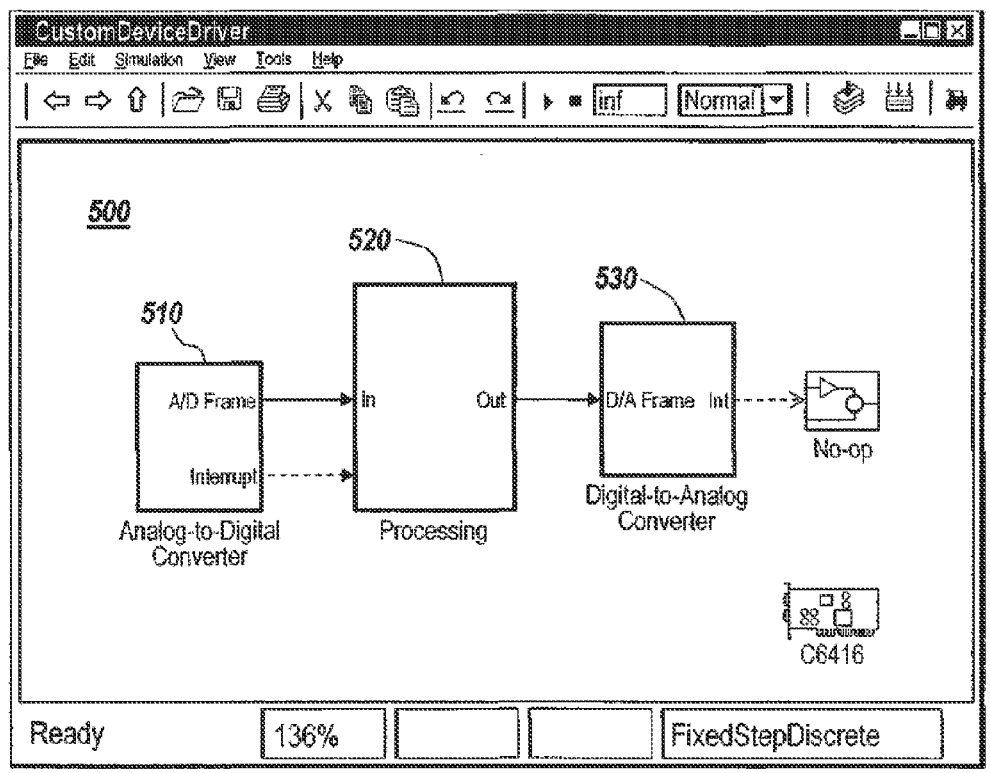
FIG. 5 is an example of a block diagram having an assigned target and device drivers created using the present invention.

An exemplary block diagram 500 of the specific device drivers of 100 of FIG. 1 can be seen in FIG. 5. Like in FIG. 1, the block diagram 500 involves an Analog-to-Digital Converter (ADC) 510, a processing block 520, and a Digital-to-Analog Converter (DAC) 530. Unlike FIG. 1, here the device drivers are not constant for a specific device, such as the TLV320AIC23 as in FIG. 1, but are created as subsystems (shown in FIG. 6 and FIG. 7) using the driver constructing block set 400 of FIG. 4.

Figure 6A:
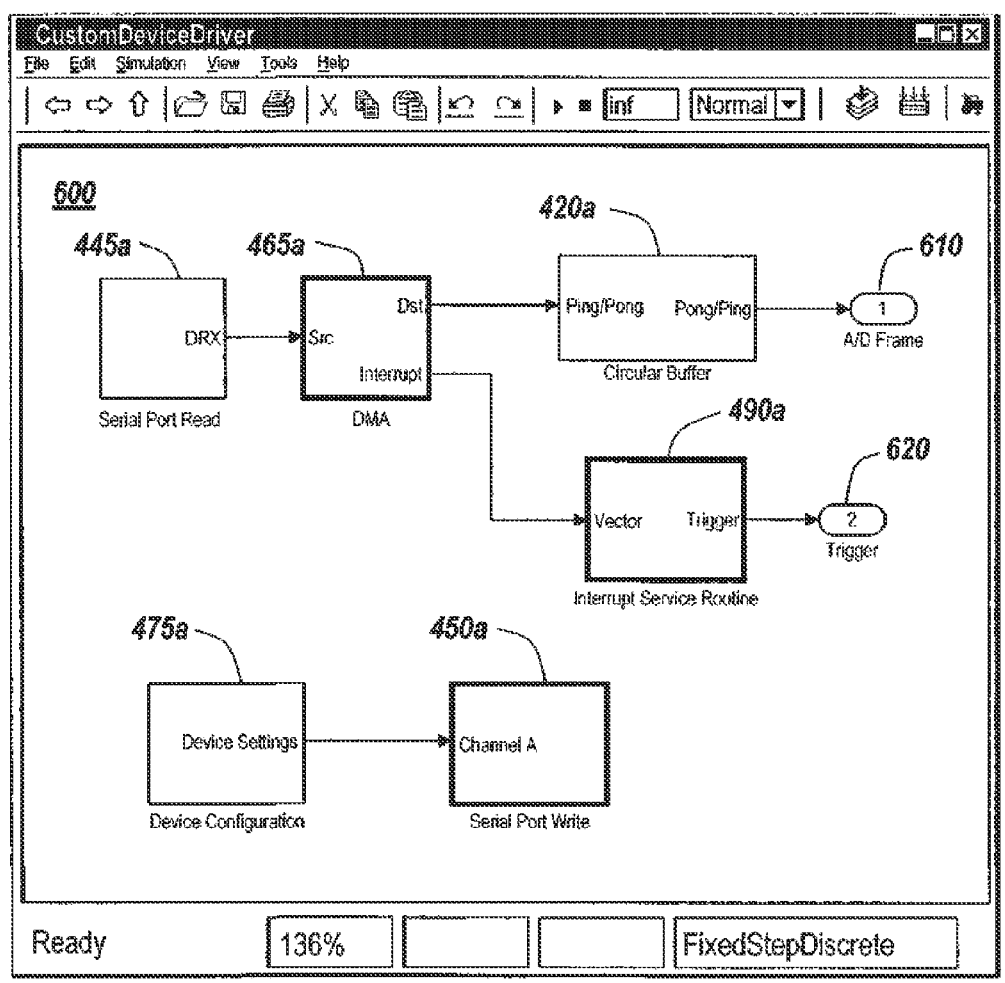
FIG. 6A is an exemplary block diagram of a device driver for the Analog-to-Digital Converter of FIG. 5

An exemplary block diagram 600 of a driver for the Analog-to-Digital Converter 510 of FIG. 5 can be seen in FIG. 6A. The custom device driver is created as a subsystem. Here the driver comprises a Serial Port Read block 445a, a DMA block 465a, a Circular Buffer block 420a, an Interrupt Service Routine (ISR) block 490a, a Device Configuration block 475a, and a Serial Port Write block 450a. In this example, the Device Configuration block 475a accepts device control parameter values from the user via a user-interface (UI) and configures the device by writing to the Serial Port connected to the device by use of the Serial Port Write block 450a. The DMA controller is programmed by use of the DMA block 465a, the digitized analog-to-digital converter data is read by the DMA controller (DMA block 465a) and written to a circular buffer (Circular Buffer block 420a), and then data from the Circular Buffer block 420a is sent to the downstream processing block (subsystem output 610). Once the DMA transfer event is complete, the DMA block 465a generates a DMA completion interrupt. With interrupt receipt, the Interrupt Service Routine block 490a sends a trigger signal to the downstream processing block to initiate execution (subsystem output 620).

Figure 6B:
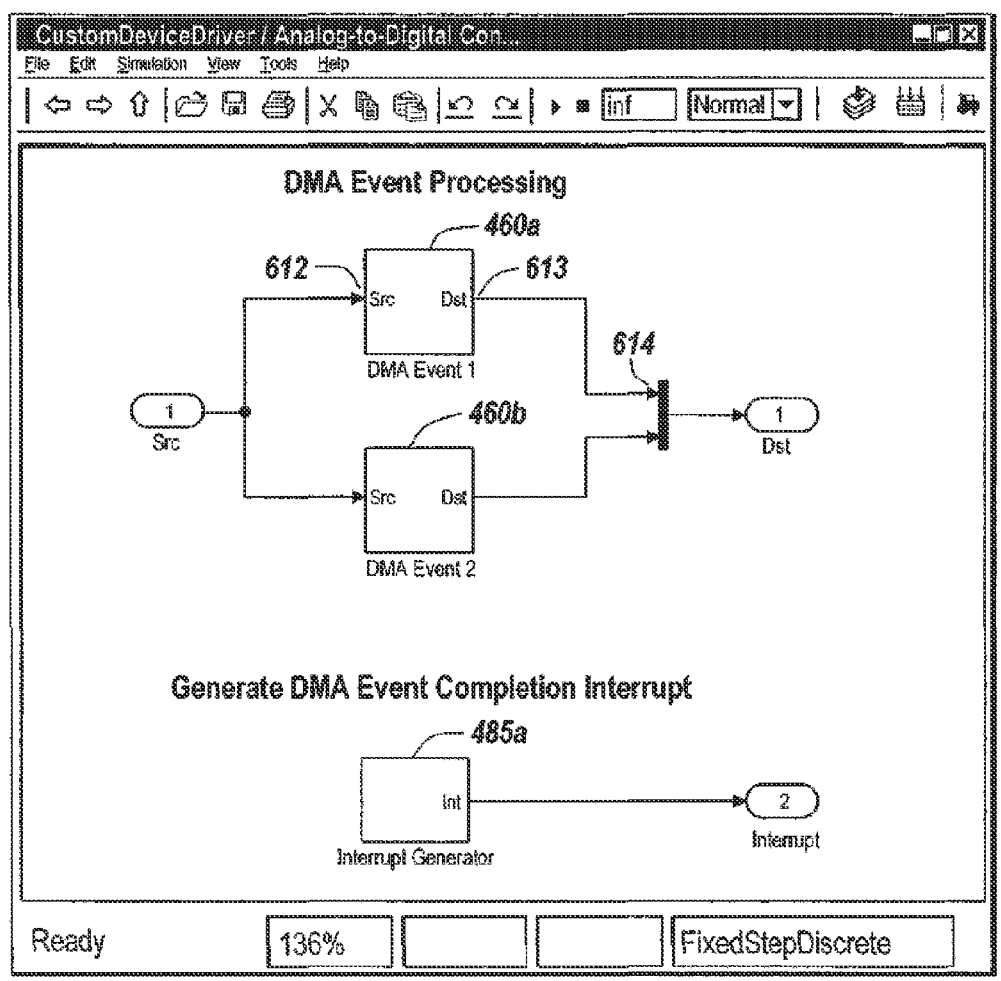
FIG. 6B is an exemplary block diagram of a DMA block, implemented as a subsystem of other blocks.

DMA block 465 of the custom driver block set of FIG. 4 can be created as a subsystem using DMA Event blocks 460 and the Interrupt Generator block 485 from the custom driver block set of FIG. 4. FIG. 6B shows that the instance of the DMA block 465a used in example 600 is made up two instances of the DMA Event block 460a and 460b. The DMA Event block 460a configures the DMA controller to transfer data from the source specified by the block connected to its input port 612 to the destination specified by the block connected to its output port 613 according to the user specified settings. In this example, DMA Event block 460a is user-specified to write to one memory location, while DMA Event 460b is user-specified to write to another memory location. The data output from DMA Event block 460a is multiplexed with the data output from DMA Event 460b by the MUX block 614, meaning only one DMA Event block is writing at any given time. From example 600 of FIG. 6A, it is clear the DMA Event blocks 460a and 460b are transferring data from the serial port (represented by the Serial Port Read block 445a) to a circular buffer (represented by the Circular Buffer block 420a). The Interrupt Generator block 485a is used to generate a DMA event-completion interrupt at the conclusion of a DMA event transaction. In example 600, this interrupt signal is propagated to the Interrupt Service Routine block 490a.

FIGS. 7A-7E show various example user interfaces to the blocks of the custom driver block set 400 of FIG. 4. The various options, and user-settings, allow the blocks to adapt to new custom devices for custom driver creation. FIGS. 7A-7E show the selected settings for the Analog-to-Digital Converter example 600 of FIGS. 6A and 6B.

Figure 7A:
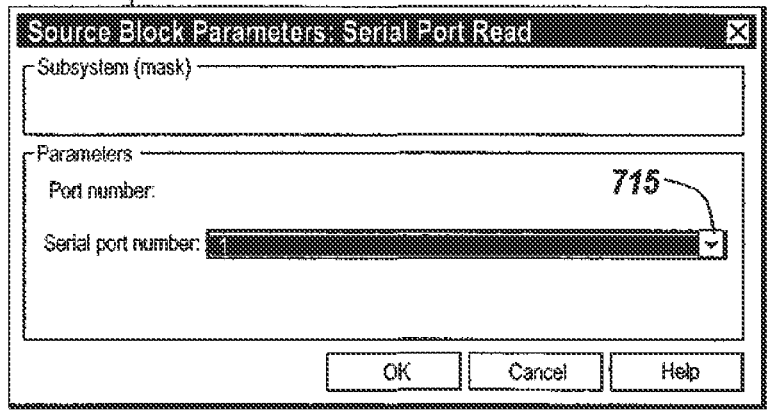
FIGS. 7A-7J are exemplary interfaces for user options and settings corresponding to the driver constructing blocks of the present invention.

The interface screen 710 of FIG. 7A can be used to configure the Serial Port Read Block 445a of FIG. 6A. In this example, the screen provides the ability to assign a serial port number to read from, in this case 1, using a pull down menu 715.

Figure 7B:
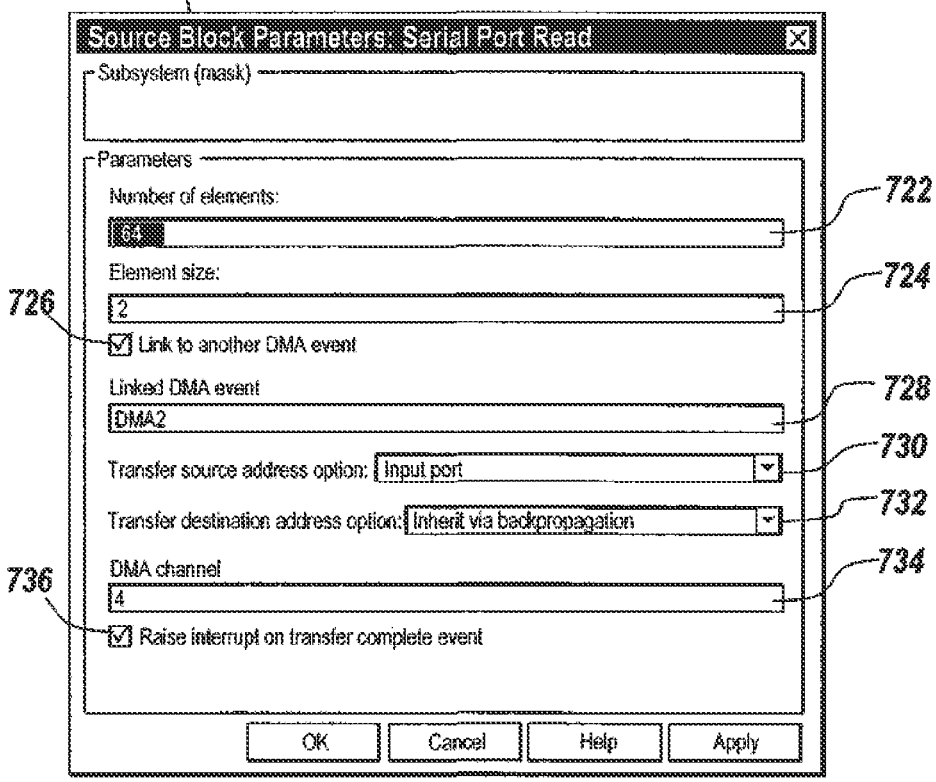

The interface screen 720 of FIG. 7B can be used to configure DMA Event block 460b of FIG. 6B. In this example, the screen provides fields allowing a user to input the number of elements 722 and element size 724. The user also has the option of linking to another DMA event 726 which is specified by the user 728. The transfer source address option 730 and destination address option 732 may also be selected using a pull down menu. In this example, a field is provided for the user to specify the DMA channel 734 as well as the option to select the raising of interrupt on completion of a DMA event transfer 736.

Figure 7C:
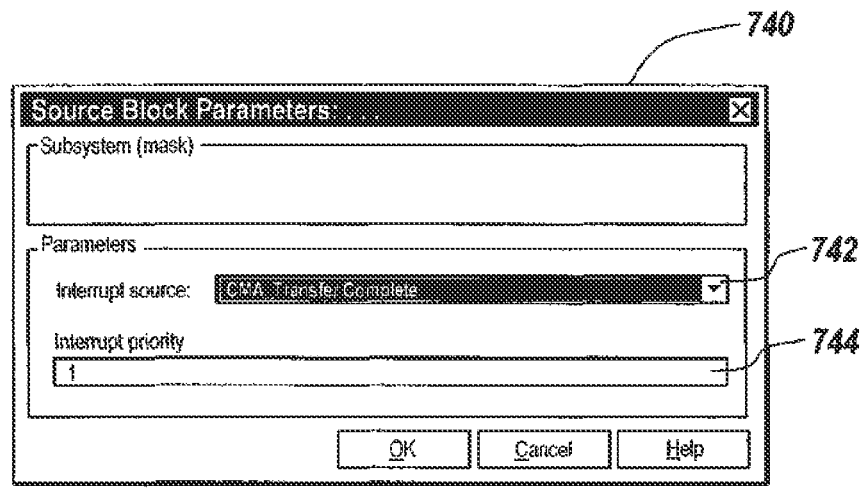

The interface screen 740 of FIG. 7C can be used to configure Interrupt Generator block 485b of FIG. 6B. In this example, the screen provides the ability to assign an interrupt source, in this case, the completion of a DMA transfer, using a pull down menu 742. The user may also assign an interrupt priority, here 1, by filling in the provided field 744.

Figure 7D:
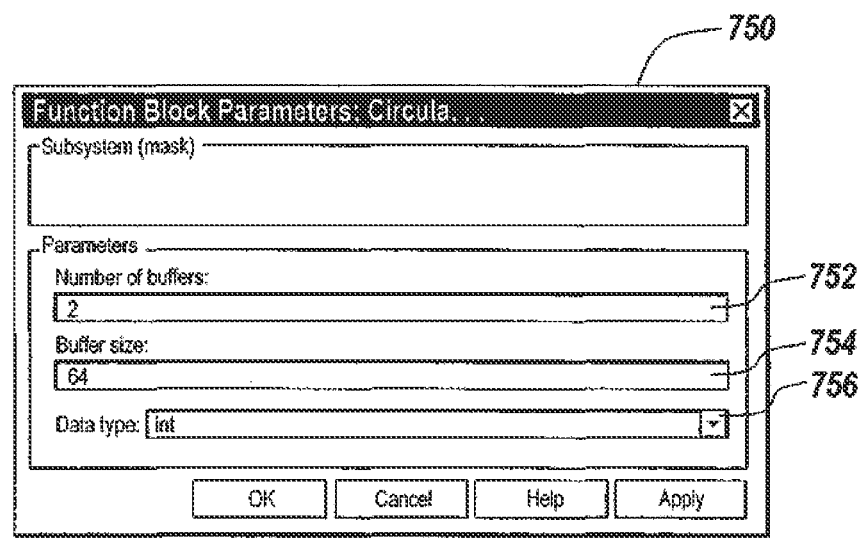

The interface screen 750 of FIG. 7D can be used to configure Circular Buffer block 420a of FIG. 6A. In this example, fields 752 and 754 are provided to allow the user to specify the number of buffers (2), and buffer size (64). The user may also select data type (int) using a pull down menu 756.

Figure 7E:
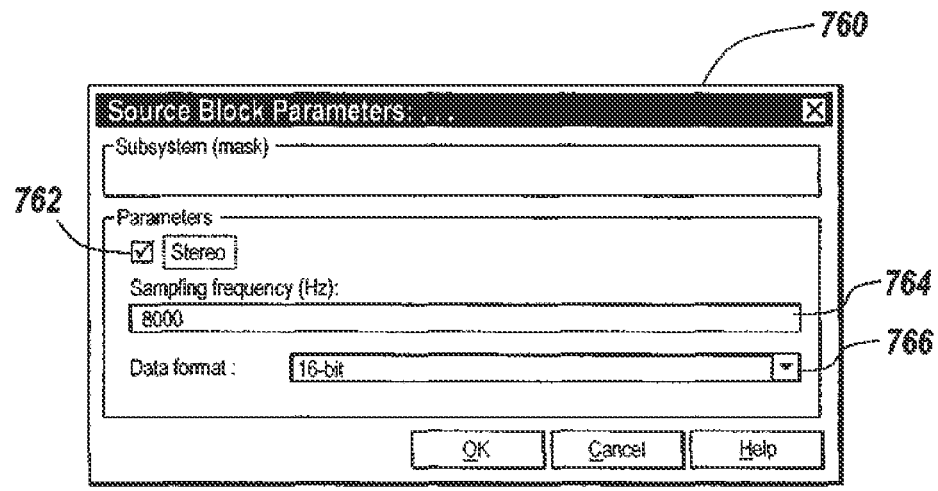

The interface screen 760 of FIG. 7E can be used to configure Device Configuration block 475a of FIG. 6A. In this example the device is being configured to read in stereo audio 762. The sampling frequency is specified in the given field 764 as 8000 Hz. The Data format is specified as 16-bit using the pull down menu 766.

Figure 7F:
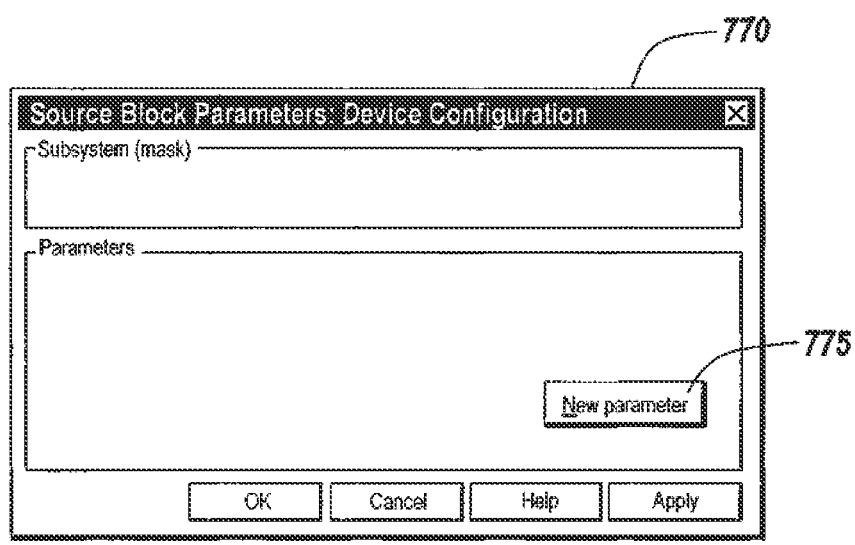
Figure 7G:
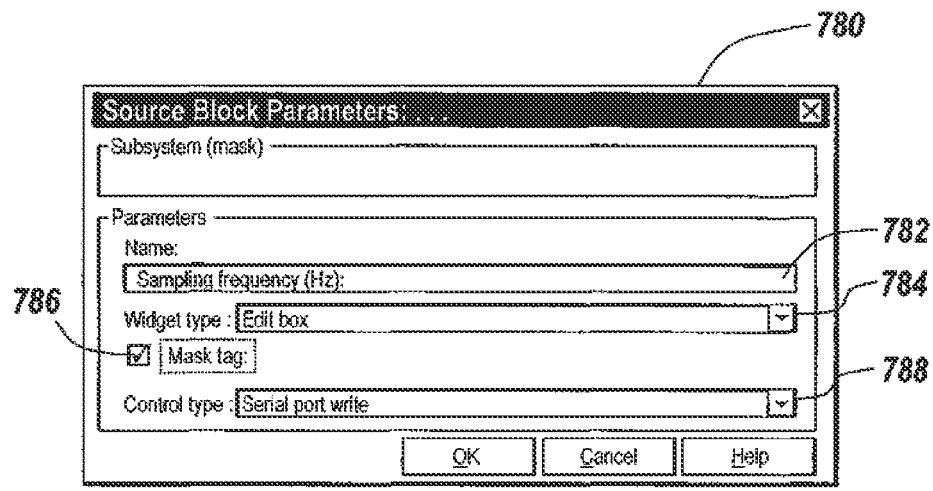
Figure 7H:
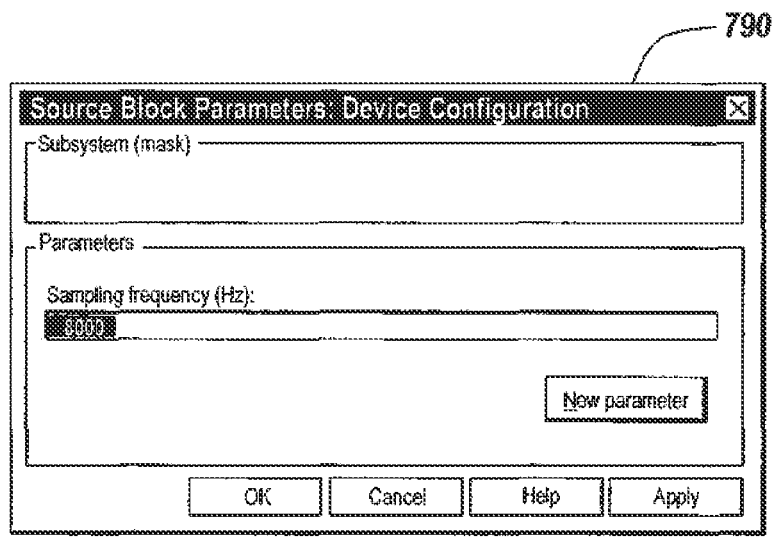

FIGS. 7F-7J show the sequence of the user interfaces involved in customizing Device Configuration block 475a for a specific device. FIG. 7F shows the initial user interface 770 of Device Configuration block 475a when copied from the device driver library into the device driver subsystem of FIG. 6A. New parameters for a custom device can be added by using 'New parameter' push-button 775 of the user interface 770. In the resulting user interface 780 of FIG. 7G, the user can define attributes of the parameter such as: Name 782, Widget type 784, Mask tag 786 and Control type 788. Name and Widget type instruct how to display the new parameter in the Device Configuration block user interface, while the Control type specifies how the parameter value gets communicated to the device. Depending on the selected values additional widgets may be displayed in the user interface 780. For example, if the Control type selection is 'Memory write', the 'Memory address' shows in the user interface. Mask tag enables the user to mark a parameter as upward displayable (and changeable in the use of the driver), i.e. to enable propagation of the same parameter to the user interface of the entire subsystem that includes Device Configuration. FIG. 7H shows the user interface 790 of the Device Configuration block after the first parameter has been added, while FIG. 7E shows completed user interface. It should be noted that there are parameters that are set one-time in the creation of a device drivers, and those that are set when the driver is used, e.g., options provided by the device itself.

Figure 7I:
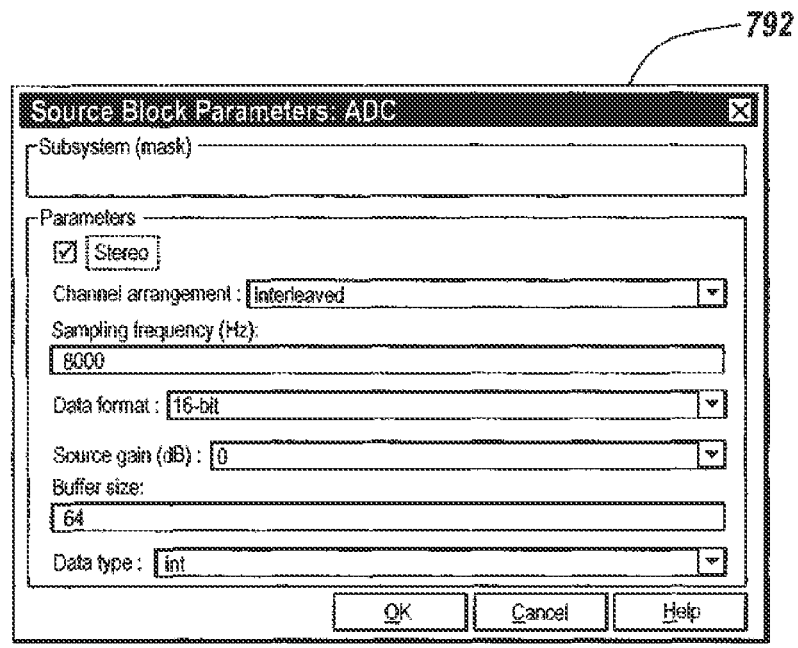

FIG. 7I shows the user interface 792 of the Analog-to-Digital Converter subsystem block 510 (corresponding to the subsystem example 600 of FIG. 6A) of example 500 of FIG. 5. Tagged parameters from the Device Configuration block 475a as well as from the other device driver blocks in this subsystem have been propagated automatically to the user interface. Any change to the parameter values in the subsystem user interface maps automatically to the corresponding parameter values of the device driver blocks included in the subsystem.

Figure 7J:
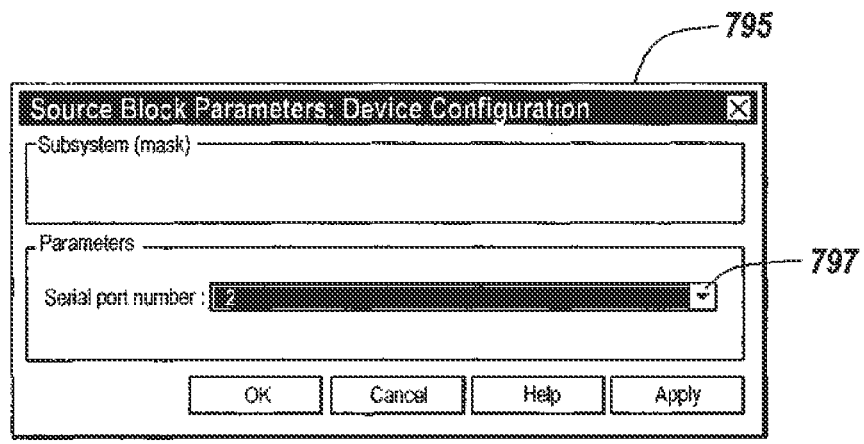

The interface screen 795 of FIG. 7J can be used to configure the Serial Port Write Block 450a of FIG. 6A. In this example, the screen provides the ability to assign a serial port number to write to, in this case 2, using a pull down menu 797.

After the device driver has been designed and configured, code can be generated from the block diagram. For the example presented in FIGS. 6A-B and 7A-E the code generated can look like:

```
/* include chip support library with low-level support for on-chip
peripherals */
#include <cs1.h>
/*           800
/*
    Declaration/definition of the Circular Buffer block:
    number of buffers=2, buffer length=64, data type="int"
*/
struct
{
    int buf1 [64];
    int buf2 [64];
} CircularBuffer;
/*
    Declaration/initialization of the buffer pointers:
    Data pointer: buf1, DMA transfer destination pointer: buf2
*/
enum _bufidx = {buf1=0, buf2=1};
_bufidx bufidx = buf1;
int* datptr = &CircularBuffer.buf1;
int* dstptr = &CircularBuffer.buf2;
/***********************************************/
/*           802
/*
    Implementation of the DMA block:
    number of DMA events=2, transfer length=64, element size=2,
    linking DMA events, linked events=DMA1/DMA2
    source of data transfer=SerialPortReadRX
    destination of data transfer=bus1/buf2
    raise interrupt on transfer complete event
    DMA channel used=4/5
*/
void DMASetup (void)
{
    hDMA1 = DMA_allocTable (-1);
    hDMA2 = DMA_allocTable (-1);
    DMA_configArgs (hDMA1, 64, 2,
            DMA_OPT_LINK_YES, hDMA2,
            DMA_OPT_LINK_YES,
            SerialPortReadRX,
            CircularBuffer.buf1,
            DMA_OPT_TCC_OF (0X4));
    DMA_configArgs (hDMA2, 64, 2,
            DMA_OPT_LINK_YES, hDMA1,
            DMA_OPT_TCINT_YES,
            SerialPortReaaRX,
            CircularBuffer.buf.2,
            DMA_OPT_TCC_OF (0x5));
    DMA_intEnable (4);
    DMA_intEnable (5);
}
/*           804
```

```
/*
    Implementation of the Device Configuration block:
    sampling frequency=8000 Hz,
    stereo mode=Yes
    data format=16-bit
*/
void deviceConfig (void)
{
    /* Write to serial port to set up ADC device */
    serialPortWrite (0xFFDA); // sampling frequency: 8000 Hz
    serialPortWrite (0xAB84); // stereo mode: Yes
    serialPortWrite (0x0074); // data format: 16-bit
}
/*           806
/*
    Implementation of the Interrupt Service Routine block:
    Swap buffers buf1 and buf2 upon DMA interrupt
*/
interrupt ISR (void)
    /* Swap buffers buf1 and buf2 upon DMA interrupt* /
    if (bufidx == buf1)
    {
        bufidx == buf2;
        datptr = &CircularBuffer.buf2;
        dstptr = &CircularBuffer.buf1;
    }
    else
    {
        bufidx == buf1;
        datptr = &CircularBuffer.buf1;
        dstptr = &CircularBuffer.buf2;
    }
    /* Trigger downstream processing */
    Trigger = 1;
}
void setupInterrupts (void)
{
    memoryWrite (0x008, 0x1C07); // set-up DMA interrupt
}
/*           808
/*
    Implementation of MAIN:
    initialization of device driver, and processing of device-gathered
    data.
int main ( )
{
    DMASetup ( );
    deviceConfig ( );
    setupInterrupts ( );
    GIE = 1; // globally enable interrupts
    while (1)
    {
        if (Trigger == 1)
        {
            ProcessADCdata(datptr)
        }
    }
}
```

The segment of code 800 represents the initialization code to set up circular buffer (generated from Circular Buffer block 420a). The user settings from FIG. 7D are used to define the number of buffers, size of buffers, and type of data. The section of code 802 represents the code (generated from DMA block 465a) to set-up of the DMA controller (user-specified in FIG. 7B) and the DMA completion interrupt. The code segment 804 represents the configuring of the device (generated from Device Configuration block 475a) with the device settings user-specified in FIG. 7E. The code segment 806 represents the interrupt service routine, generated from the Interrupt Service Routine block 490a. The code segment 808 represents the main routine invoking the Analog-to-Digital Converter driver code, sequencing through initialization, and run-time processing of Analog-to-Digital Converter data.

Figure 8:
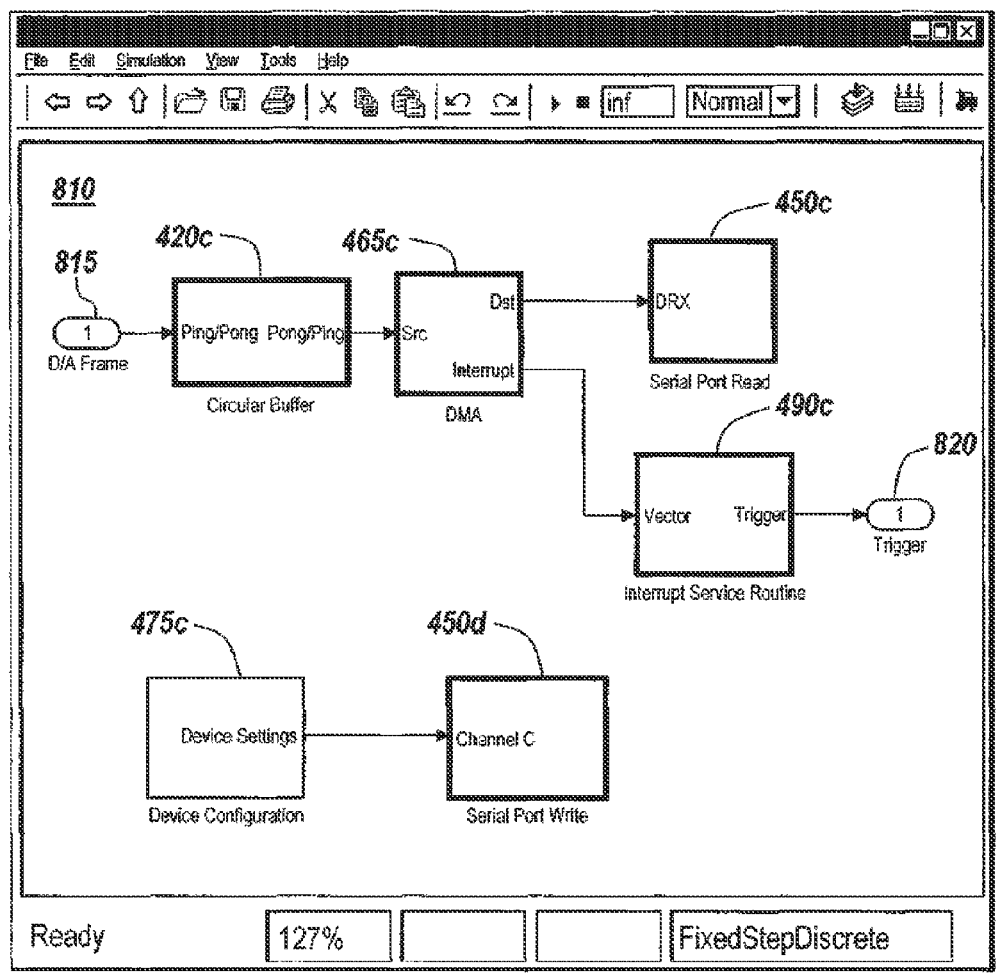
FIG. 8 is an exemplary block diagram of a device driver for the Digital-to-Analog Converter of FIG. 5

An exemplary block diagram 810 of a driver for the Digital-to-Analog Converter 530 of FIG. 5 can be seen in FIG. 8. The custom device driver is again created as a subsystem. As can be seen, many of the custom block set blocks used in to build the Analog-to-Digital Converter example 600 of FIG. 6A are reused to create the Digital-to-Analog Converter example 800 of FIG. 8. Here the driver comprises a Circular Buffer block 420c, a DMA block 465c, a Serial Port Write block 450c, an Interrupt Service Routine (ISR) block 490c, a Device Configuration block 475c, and Serial Port Write block 450d. In this example, the Device Configuration block 475a accepts device control parameter values from the user via a user-interface (UI) and configures the device by writing to the Serial Port connected to the device by use of the Serial Port Write block 450d. The circular buffer (Circular Buffer block 420c) receives the data from the processing block (subsystem input 815) and passes it to the DMA controller which is programmed by use of the DMA block 465c. The data is read by the DMA controller (DMA block 465c) and written to the serial port (Serial Port Write Block 450c). Once the DMA transfer event is complete, the DMA block 465c generates a DMA completion interrupt. With interrupt receipt, the Interrupt Service Routine block 490c generates a trigger signal 820.

Examples 600 and 800 of FIGS. 6A and 8, respectively, have shown how a custom DMA-based synchronous device driver can be created using blocks from the custom block set 400 of FIG. 4. The block diagram of FIG. 9 shows how a more complex custom driver can also be created by using blocks from the custom block set 400 of FIG. 4.

Figure 9:
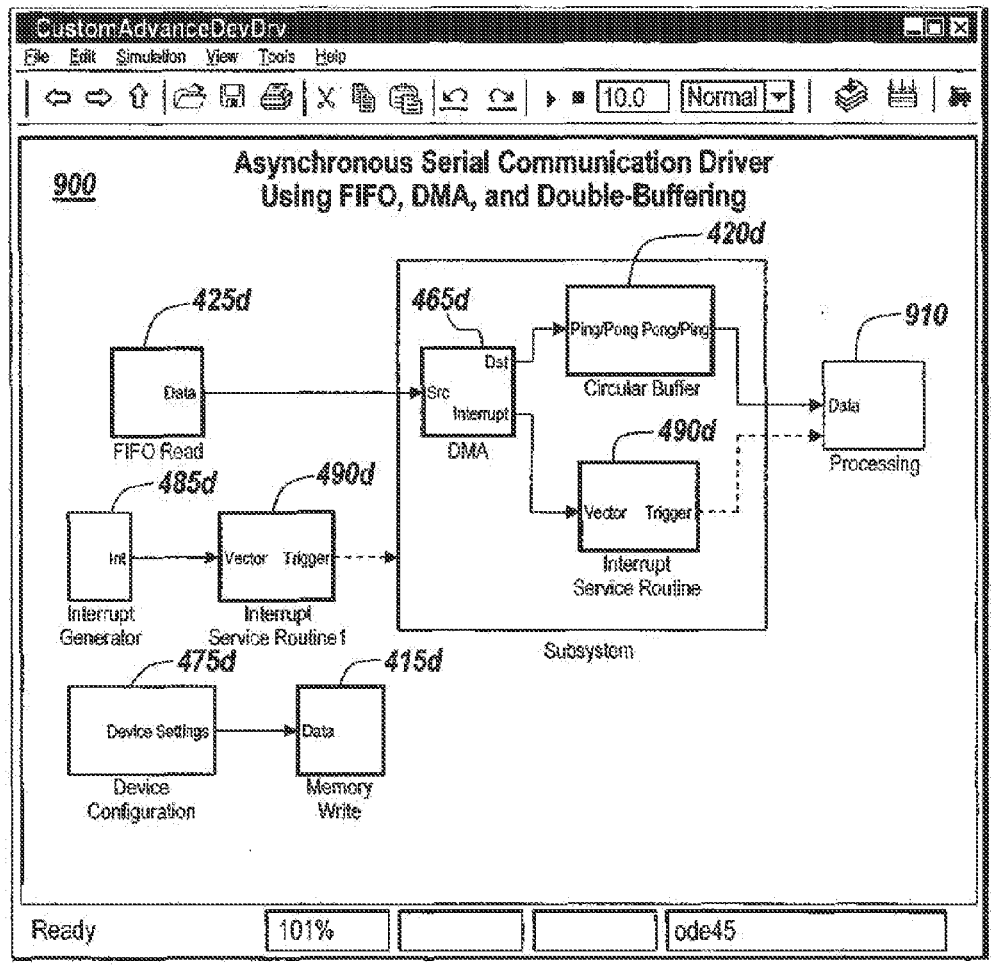
FIG. 9 is an exemplary block diagram of a device driver for a complex asynchronous FIFO driver over a serial interface

The exemplary block diagram 900 of FIG. 9 represents an asynchronous external FIFO device driver that reads FIFO data and provides the data to processing functions in a circular double buffer. At initialization the FIFO is configured by writing the settings held by the Device Configuration Block 475d to the FIFO memory-mapped registers by use of the Memory Write block 415d. The data transfer is triggered by the Interrupt Service Routine block 490d when the processor receives an external interrupt, indicating "FIFO full" (configured by the Interrupt Generator block 485d). Upon external interrupt receipt, the DMA transfer is initiated by the DMA interrupt block 465d, which reads data from the FIFO via the FIFO Read block 425d and writes the data to the circular buffer via Circular Buffer block 420d, and generates and sends a DMA completion interrupt to the Interrupt Service Routine (block 490d). The Interrupt Service Routine block 490d send a trigger signal to the Processing block 910, which in turn processes the FIFO data provided by the Circular Buffer block 420d. After processing the FIFO data, the application of system 900, "waits" once again for the asynchronous external interrupt signal to start the data transfer and data processing sequence again. Note that this driver application is more complicated than both example 600 and example 800 in that there are two interrupts (external and DMA-completion) and associated two Interrupt Service Routine triggers, as opposed to one each in the previous driver examples.

It should be apparent to one skilled in the art that drivers of arbitrary complexity can be created in similar fashion using blocks from the custom block set 400 of FIG. 4.

Once the necessary drivers have been created using one or more blocks from the custom driver block set, driver code can be generated from the drivers. In embodiments where a target computing platform has been specified, or a platform specific custom drive block set has been used, the driver code will automatically be generated for that platform for use with the identified device. Examples of suitable formats for driver code include, but are not limited to, C, assembly, and HDL. Other possible code types will be apparent to one skilled in the art given the benefit of this disclosure.

Figure 10:
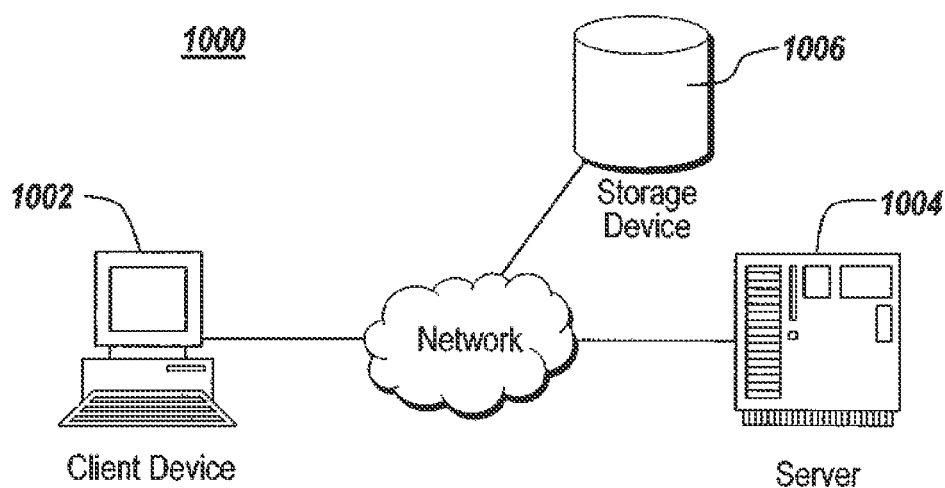
FIG. 10 illustrates a client-server environment suitable for practicing an illustrative embodiment of the present invention.

The examples to this point have focused primarily on the system where the graphical modeling environment was on a local computing device. The graphical modeling environment may, of course, also be implemented on a network 1000, as illustrated in FIG. 10, having a server 1004 and a client device 1002. Other devices, such as a storage device 1006, may also be connected to the network.

In one such embodiment a system for generating and displaying a graphical modeling application, comprises a distribution server 1004 for providing to a client device, a custom driver block set, wherein one or more blocks of the block set can be used to create a driver for an electronic device; and a client device 1002 in communication with the distribution server 1004. Here the distribution server 1004 provides a client device 1002, such as a computing device discussed above with regard to FIG. 2, with a custom driver block set, wherein one or more blocks of the block set can be used to create a driver for an electronic device. The blocks of the custom driver block set may be configured to create a custom device driver. The client 1002 may then use the custom device driver to generate driver code.

In another embodiment, the server 1004 may execute the graphical modeling environment. A user may then interact with the graphical modeling environment on the server 1004 through the client device 1002. The server 1004 is capable of executing a graphical modeling environment, wherein the graphical modeling environment provides a custom driver block set, wherein one or more blocks of the block set can be used to create a driver for an electronic device. The client device 1002 is in communication with the server 1004 over the network 1000. A selection is then provided, from the client 1002 to the server 1004, for one or more blocks of the custom driver block set. The driver may then be assembled for device. In some embodiments, driver code can then be generated.

It will be understood by one skilled in the art that these network embodiments are exemplary and that the functionality may be divided up in any number of ways over a network.

The proceeding examples have focused primarily on models of digital signal processing systems in the electrical domain but it will be apparent to one skilled in the art that there are numerous other domains, systems, fields and applications for which the present invention would be suitable.

The present invention has been described relative to illustrative embodiments. Since certain changes may be made in the above constructions without departing from the scope of the invention, it is intended that all matter contained in the above description or shown in the accompanying drawings be interpreted as illustrative and not in a limiting sense.

It is also to be understood that the following claims are to cover all generic and specific features of the invention described herein, and all statements of the scope of the invention which, as a matter of language, might be said to fall therebetween.

What is claimed is:
1. A method comprising:
providing information identifying blocks of a block diagram,
the blocks representing functions associated with a plurality of device drivers,
the functions including a function to read from or write to serial ports,
the plurality of device drivers being used to control a plurality of devices,
the providing being performed by a computing device;

receiving parameters to configure the blocks,
    the received parameters being received from a user associated with the computing device,
    the received parameters corresponding to values of the blocks,
    the receiving being performed by the computing device;
configuring the blocks, based on the received parameters, to generate another device driver,
    the received parameters, received in association with the other device driver, including information identifying one or more serial port numbers relating to the function to read from or write to serial ports,
    the other device driver including the information identifying the one or more serial port numbers,
    configuring the blocks including automatically changing the values of the blocks, based on the received parameters, to configure the blocks,
    the configuring being performed by the computing device; and
generating code for the other device driver based on configuring the blocks,
    a particular device being controlled, using the other device driver, based on the other device driver including the information identifying the one or more serial port numbers,
    the generating being performed by the computing device.

2. The method of claim 1, where the blocks include a block representing a function to read from and write to a memory.

3. The method of claim 1, where the blocks include a block representing a function to configure a Direct Memory Access controller of a device that controls the particular device using the other device driver.

4. The method of claim 1, where the blocks include a block representing a function to generate an interrupt signal.

5. The method of claim 1, where the blocks include a block for configuring the other device driver for the particular device.

6. The method of claim 1, further comprising:
controlling the particular device using the other device driver,
    where the computing device includes information identifying devices that are supported by the computing device, and
    where information identifying the particular device is not included in the information identifying the devices that are supported by the computing device.

7. The method of claim 1, where providing the information identifying the blocks includes providing the information identifying the blocks to a client device, and
    where receiving the parameters includes receiving the parameters from the client device.

8. The method of claim 7, further comprising:
receiving, from the client device, selection of the blocks from a plurality of blocks.

9. A non-transitory computer-readable medium storing instructions, the instructions comprising:
one or more instructions which, when executed by one or more processors of a computing device, cause the one or more processors to provide information identifying blocks of a block diagram,
    the blocks representing functions associated with a plurality of device drivers,
    the functions including a function to read from or write to serial ports,
    a plurality of devices being controlled using the plurality of device drivers;
one or more instructions which, when executed by the one or more processors, cause the one or more processors to receive parameters to configure the blocks,
    the received parameters being mapped to values of the blocks;
one or more instructions which, when executed by the one or more processors, cause the one or more processors to configure the blocks, based on the received parameters, to generate another device driver,
    the received parameters, received in association with the other device driver, including information identifying one or more serial port numbers relating to the function to read from or write to serial ports,
    the other device driver including the information identifying the one or serial port numbers,
    the one or more instructions to configure the blocks including one or more instructions to automatically change the values of the blocks, based on the received parameters, to configure the blocks; and
one or more instructions which, when executed by the one or more processors, cause the one or more processors to generate code for the other device driver based on configuring the blocks,
    a particular device being controlled, using the other device driver, based on the other device driver including the information identifying the one or more serial port numbers.

10. The non-transitory computer-readable medium of claim 9, where the blocks include a block representing a function to read from and write to a memory.

11. The non-transitory computer-readable medium of claim 9, where the blocks include a block representing a function to set up parameters for Direct Memory Access (DMA), and
where the one or more instructions to receive the parameters include:
    one or more instructions to receive information identifying a source address relating to a DMA transfer and information identifying a destination address relating to the DMA transfer,
        where the other device driver includes the information identifying the source address and the information identifying the destination address, and
        where the particular device is controlled based on the other device driver including the information identifying the source address and the information identifying the destination address.

12. The non-transitory computer-readable medium of claim 9, where the blocks include a block representing a function to generate an interrupt signal, and
where the one or more instructions to receive the parameters include:
    one or more instructions to receive information identifying an interrupt source, where the other device driver includes the information identifying the interrupt source, and
    where the particular device is controlled based on the other device driver including the information identifying the interrupt source.

13. The non-transitory computer-readable medium of claim 12, where the interrupt source includes a completion of a Direct Memory Access transfer.

14. The non-transitory computer-readable medium of claim 9, where the blocks include a block representing a function to write to and read from a circular buffer, and
where the one or more instructions to receive the parameters include:

one or more instructions to receive information identifying a quantity of buffers and information identifying a buffer size.

15. The non-transitory computer-readable medium of claim 9, where the blocks include a block representing a function for configuring the other device driver for the particular device, and
where the one or more instructions to receive the parameters include:
one or more instructions to receive at least one of:
information identifying a sampling frequency, or
information identifying a data format.

16. The non-transitory computer-readable medium of claim 9, where the one or more instructions to provide the information identifying the blocks include:
one or more instructions to provide the information identifying the blocks, via a graphical modeling environment, to a client device, and
where the one or more instructions to receive the parameters include:
one or more instructions to receive the parameters from the client device via a user interface of the graphical modeling environment.

17. A system comprising:
a computing device to:
provide information identifying blocks of a block diagram,
the blocks representing functions associated with a plurality of device drivers,
the functions including a function to read from or write to serial ports,
the plurality of device drivers being used to control a plurality of devices;
receive parameters to configure the blocks,
the received parameters being received from a user associated with the computing device,
the received parameters being mapped to values of the blocks;
configure the blocks, based on the received parameters, to generate another device driver,
the received parameters, received in association with the other device driver, including information identifying one or more serial port numbers relating to the function to read from or write to serial ports,
the other device driver including the information identifying the one or more serial port numbers,
when configuring the blocks, the computing device is to automatically change the values of the blocks, based on the received parameters, to configure the blocks; and
generate code for the other device driver based on configuring the blocks,
a particular device being controlled, using the other device driver, based on the other device driver including the information identifying the one or more serial port numbers.

18. The system of claim 17, where, when providing the information identifying the blocks, the computing device is to provide the information identifying the blocks to a client device, and
where, when receiving the parameters, the computing device is to receive the parameters from the client device.

19. The system of claim 17, where the blocks include one or more of:
a block representing a function to read from and write to a memory,
a block representing a function to configure a Direct Memory Access controller of a device that controls the particular device,
a block representing a function to generate an interrupt signal, or
a block for configuring the other device driver for the particular device.

20. The system of claim 19, where, when receiving the parameters, the computing device is to receive:
information identifying a source address relating to a DMA transfer,
information identifying a destination address relating to the DMA transfer, or
information identifying an interrupt source.

* * * * *